United States Patent [19]

Kobayashi

[11] Patent Number: 5,138,341
[45] Date of Patent: Aug. 11, 1992

[54] PLOTTER WITH DRIVE ROLLERS HAVING VARIABLE RADIAL CONTACT SURFACES

[75] Inventor: Hisayuki Kobayashi, Ueda, Japan
[73] Assignee: Mimaki Engineering, Nagano, Japan
[21] Appl. No.: 695,604
[22] Filed: May 3, 1991
[30] Foreign Application Priority Data Jul. 24, 1990 [JP] Japan .................. 2-195657

[51] Int. Cl.$^5$ .................. G01P 15/24; B23Q 15/00; B65H 16/00; B41J 13/02
[52] U.S. Cl. .................. 346/136; 346/134; 346/139 R; 226/15; 226/16; 226/24; 226/181; 226/193; 242/57.1; 400/579; 400/617; 400/619; 400/636; 400/639
[58] Field of Search .................. 346/134, 136, 139 R; 226/181, 193, 15, 16, 24; 242/57.1; 400/579, 617, 619, 636, 639

[56] References Cited

U.S. PATENT DOCUMENTS

| 4,630,071 | 12/1986 | Nakazawa | 346/136 |
| 4,683,480 | 7/1987 | Sakamoto et al. | 346/136 X |
| 4,839,674 | 6/1989 | Hanagata et al. | 346/136 |

Primary Examiner—Mark J. Reinhart
Assistant Examiner—Gerald E. Preston
Attorney, Agent, or Firm—Price, Gess & Ubell

[57] ABSTRACT

A plotter wherein, while a sheet is being moved on a recording surface, figures, characters etc. are automatically depicted on the surface of the sheet, or the contours of figures, characters etc. are automatically cut in the surface of the sheet. In the plotter, both the side edges of the sheet are respectively held between drive rollers and corresponding pinch rollers mounted at both the sideward parts of the recording surface in opposition to each other, and the drive rollers at both the sideward parts of the recording surface are rotated synchronously to each other, whereby the sheet is moved in the rotating direction of the drive rollers on the recording surface. Each of the drive rollers is formed at its peripheral surface with milling or ruggedness for preventing the sheet from slipping. The plotter comprises piston-cylinder assemblies and associated springs for regulating respective pressures acting to press the pinch rollers at both the sideward parts of the recording surface against the surface of the sheet. It also comprises sensors for sensing the directions and degrees of the wobbles of the sheet moving on the recording surface, and a controller for controlling the lengths of the springs in accordance with the direction and degree of the wobble of the sheet sensed by the sensors, thereby to regulate the respective pressures acting to press the pinch rollers at both the sideward parts of the recording surface against the sheet surface. When the sheet has begun to wobble, the direction and degree of the wobble are sensed by the sensors, and the pressure acting to press the pinch roller against the sheet surface is increased or decreased, thereby to correct the moving orbit of the sheet.

19 Claims, 4 Drawing Sheets

PLOTTER WITH DRIVE ROLLERS HAVING VARIABLE RADIAL CONTACT SURFACES

BACKGROUND OF THE INVENTION

1. Field of the Invention

The present invention relates to a plotter which automatically depicts figures, characters etc. on the surface of a sheet or automatically cuts the contours of figures, characters etc. in the surface of a sheet while moving the sheet on a recording surface. More particularly, it relates to improvements in a sheet feed mechanism which moves the sheet, such as a roll of paper, on the recording surface.

2. Description of the Related Art

There has been well known a plotter called the paper moving type wherein, a sheet is placed on a laterally-long recording surface having a vertical section substantially in the shape of a circular arc and in which a pen or the like type of writing utensil or a cutter grasped by a pen carriage is touched down to the surface of the sheet placed on the recording surface. The pen carriage is moved in the lateral direction, namely, X direction of the recording surface on the sheet while the sheet is being moved in the widthwise direction, namely, Y direction of the recording surface on this recording surface, thereby to automatically depict a figure, a character or the like on the sheet surface with the writing utensil or to automatically cut the contours of a figure, a character or the like in the sheet surface with the cutter.

In the plotter, sets of rollers in each of which a drive roller and a pinch roller are opposed to each other are respectively mounted at both the sideward parts of the recording surface so as to be rotatable in the Y direction. Herein, in the state in which both the side edges of the sheet are held between the drive rollers and the corresponding pinch rollers at both the sideward parts of the recording surface, the drive rollers are rotated in the Y direction, thereby to move the sheet in the Y direction on the recording surface.

However, in the case where the sheet is moved in the Y direction on the recording surface in the above way, it wobbles or meanders rightwards and leftwards on the recording surface. Then, the figure, the character or the like depicted on the sheet surface or the contours of the figure, the character or the like cut in the sheet surface become(s) distorted. The appearance of the distortion is conspicuous especially on the occasion that the sheet is a roll of elongated paper and that it is moved in the Y direction on the recording surface over a long distance.

This drawback is ascribable to the fact that the substantial outer diameter of the drive roller mounted at each sideward part of the recording surface is subtly different in the individual places of the peripheral surface of the drive roller, or that either or both the side edges of the sheet held between the drive rollers and the corresponding pinch rollers mounted at both the sideward parts of the recording surface undergoes a slip or the like on the peripheral surface of the drive roller due to any cause.

Incidentally, there has been a plotter wherein, in order to prevent a sheet from wobbling and moving on a recording surface as stated above, small holes are formed at predetermined pitches in both the side edges of the sheet, while sprockets for feeding the sheet are mounted at both the sideward parts of the recording surface so as to be rotatable in a Y direction (the feed direction of the sheet). Herein, the sprockets are rotated in the Y direction while their teeth are being brought into engagement with the small holes in both the side edges of the sheet, whereby the sheet is moved in the Y direction on the recording surface without wobbling.

The plotter, however, can use only the special sheet which is formed with the small holes in both the side edges thereof. Moreover, since the sheet requires a greater width and a stage of work for forming the feeding small holes in both the side edges thereof, it becomes costly to those extents.

SUMMARY OF THE INVENTION

The present invention has been made in view of the problems of the prior art mentioned above.

Accordingly, the present invention has for its object to provide a plotter in which a sheet can be moved in a Y direction, namely, in the rotating direction of a drive roller without wobbling rightwards or leftwards on a recording surface.

In addition, it is an object of the present invention to provide a plotter in which a sheet can be exactly moved on a recording surface without employing any special sheet formed with small holes or the like for feeding the sheet.

Further, it is an object of the present invention to provide a plotter in which a sheet can be exactly moved on a recording surface at all times even when it is a roll of elongated paper.

Besides, it is an object of the present invention to provide a plotter in which figures, characters etc. can be depicted on the surface of a sheet moved on a recording surface or can be cut in the surface of a sheet, exactly without distorting the contours thereof.

According to the present invention, there is provided a plotter in which both the side edges of a sheet are respectively held between drive rollers and corresponding pinch rollers mounted at both the sideward parts of a recording surface in opposition to each other, and the drive rollers at both the sideward parts of the recording surface are rotated synchronously to each other, whereby the sheet is moved in the rotating direction of the drive rollers on the recording surface. Each of the drive rollers is formed at its peripheral surface with milling or ruggedness for preventing the sheet from slipping. The plotter comprises pressure regulation means for regulating respective pressures acting to press the pinch rollers at both the sideward parts of the recording surface against the surface of the sheet, and sensing means for sensing the directions and degrees of the wobbles of the sheet moving in the rotating direction of the drive rollers on the recording surface. Also, it comprises control means for controlling the pressure regulation means in accordance with the direction and degree of the wobble of the sheet as sensed by the sensing means, thereby to regulate the respective pressures acting to press the pinch rollers at both the sideward parts of the recording surface against the sheet surface.

In a preferred embodiment of the present invention, the pressure regulation means includes a spring which urges the pinch roller against the sheet surface, and a piston-cylinder assembly which protracts or retracts the spring for adjusting the length thereof.

In another preferred embodiment of the present invention, the sensing means includes photosensors which are laterally arrayed on each side of the recording surface.

In still another preferred embodiment of the present invention, the control means decreases the pressure of the pressure regulation means lying on the side of the recording surface to which the sheet wobbles or/and increases the pressure of the pressure regulation means lying on the side which is opposite to the wobble of the sheet, thereby to correct the moving orbit of the sheet.

According to the plotter of the present invention constructed as described above, in the state in which both the side edges of the sheet are respectively held between the drive rollers and the corresponding pinch rollers mounted at both the sideward parts of the recording surface in opposition to each other, the drive rollers at both the sideward parts of the recording surface are synchronously rotated to move the sheet in a Y direction, namely, the rotating direction of the drive rollers on the recording surface. Herein, when the sheet has begun to wobble rightwards, the rightward wobble and wobbling degree of the sheet are sensed by the sensing means. Subsequently, in accordance with the wobbling direction and wobbling degree of the sheet sensed by the sensing means, the control means controls the pressure regulation means so as to weaken the pressure P1 for pressing the right pinch roller against the surface of the right side edge of the sheet, to intensify the pressure P2 for pressing the left pinch roller against the surface of the left side edge of the sheet, relative to the pressure P1, or to weaken the pressure P1 and simultaneously intensify the pressure P2. To the contrary, when the sheet has begun to wobble leftwards, the leftward wobble and wobbling degree of the sheet are sensed by the sensing means. Subsequently, in accordance with the wobbling direction and wobbling degree of the sheet sensed by the sensing means, the control means controls the pressure regulation means so as to weaken the pressure P2 for pressing the left pinch roller against the surface of the left side edge of the sheet, to intensify the pressure P1 for pressing the right pinch roller against the surface of the right side edge of the sheet, relative to the pressure P2, or to weaken the pressure P2 and simultaneously intensify the pressure P1.

Then, the moving direction or orbit of the sheet having begun to wobble either rightwards or leftwards is corrected in the Y direction. Similarly, each time the sheet begins to wobble either rightwards or leftwards, the above operation is sequentially repeated. Consequently, the sheet is moved in the Y direction on the recording surface while wobbling neither rightwards nor leftwards.

BRIEF DESCRIPTION OF THE DRAWINGS

These and other objects and numerous effects of the present invention will become apparent by reference to the following detailed description and the accompanying drawings, in which.

DETAILED DESCRIPTION OF THE PREFERRED EMBODIMENT

First, the operating principles of the sheet feed mechanism of a plotter according to the present invention will be described.

Figure 4:
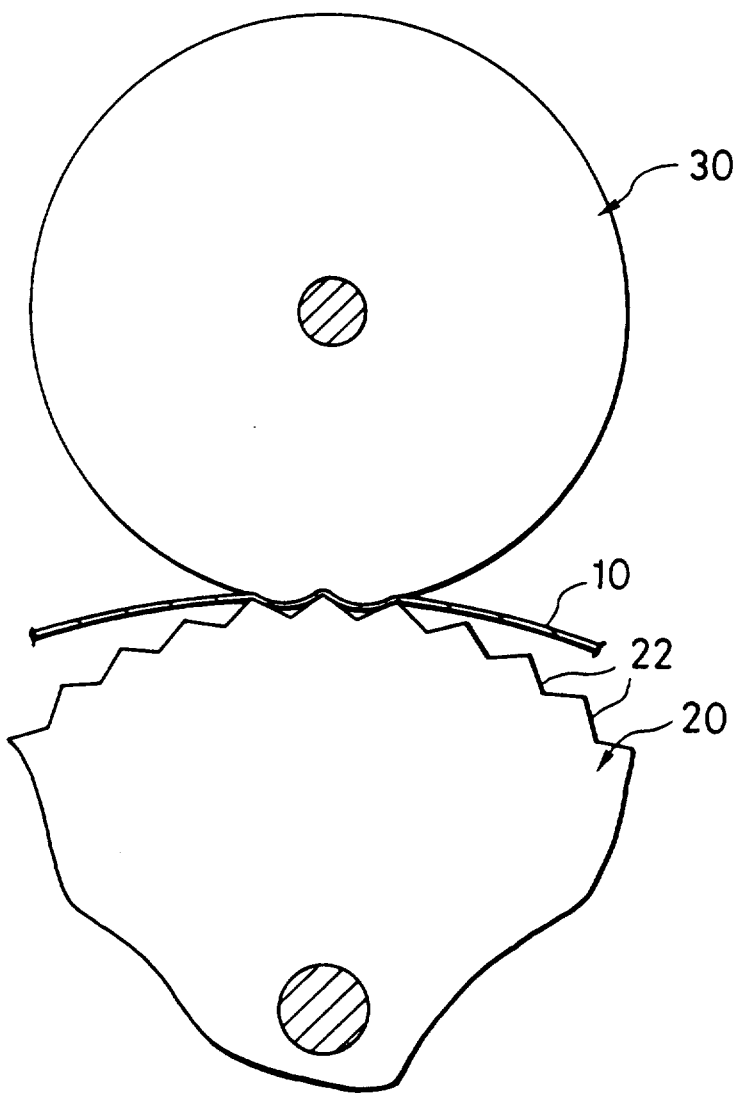
FIG. 4 is an explanatory side view showing the operating principle of the sheet feed mechanism of the plotter according to the present invention, in the state in which a high pressure is applied to a sheet.
Figure 5:
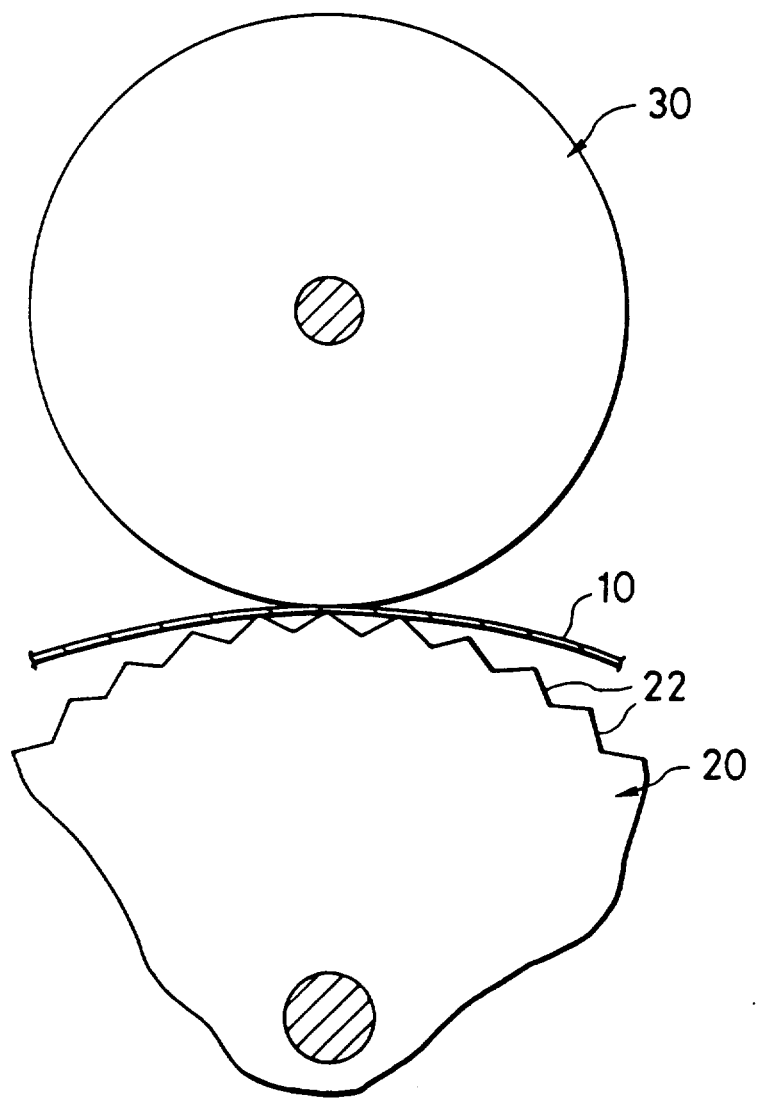
FIG. 5 is an explanatory side view similar to FIG. 4, showing the operating principle in the state in which a low pressure is applied to the sheet.

FIGS. 4 and 5 show views for elucidating the principles, and will now be referred to.

In FIG. 4, a pinch roller 30 is intensely pressed against the surface of a sheet 10 by pressure regulation means (not shown). In this case, the sheet 10 held between the pinch roller 30 and a drive roller 20, the outer peripheral milling or ruggedness 22 of which is exaggeratedly illustrated, is depressed by the pinch roller 30 to fall into the state in which it bites into the tooth spaces or recesses of the peripheral milling 22 of the drive roller 20. Herein, the sheet 10 lying in contact with the peripheral surface of the drive roller 20 comes to have parts whose positions are lower than the tooth crests or summits of the peripheral milling 22 of the drive roller 20. Accordingly, the substantial outer diameter of the drive roller 20 decreases at the peripheral part thereof lying in contact with the sheet 10, in the amount of the depth in which the sheet 10 bites into the tooth spaces of the milling 22. That is, the radial distance from the center of rotation of the drive roller 20 will vary to provide a corresponding difference in tangential velocity imparted to a sheet material. Therefore, the feed speed of the sheet 10 based on a turning force transmitted from the drive roller 20 to this sheet 10, that is, the peripheral speed of the drive roller 20 at the peripheral part thereof lying in contact with the sheet 10 lowers in correspondence with the decremental diametral amount of the depth in which the sheet 10 bites into the tooth spaces of the milling 22.

To the contrary, in FIG. 5, the pinch roller 30 is weakly pressed against the surface of the sheet 10 by the pressure regulation means. In this case, the sheet 10 held between the drive roller 20 and the pinch roller 30 falls into the state in which it overlies the tooth crests of the peripheral milling 22 of the drive roller 20. Herein, the position of the sheet 10 lying in contact with the peripheral surface of the drive roller 20 becomes the tooth crests of the peripheral milling 22 of the drive roller 20. Accordingly, the substantial outer diameter of the drive roller 20 increases at the peripheral part thereof lying in contact with the sheet 10, in the amount of the height of the teeth or tooth-like projections of the milling 22. Therefore, the feed speed of the sheet 10 based on the turning force transmitted from the drive roller 20 to this sheet 10, that is, the peripheral speed of the drive roller 20 at the peripheral part thereof lying in contact with the sheet 10 increases in correspondence with the incremental diametral amount of the height of the teeth of the milling 22.

Figure 1:
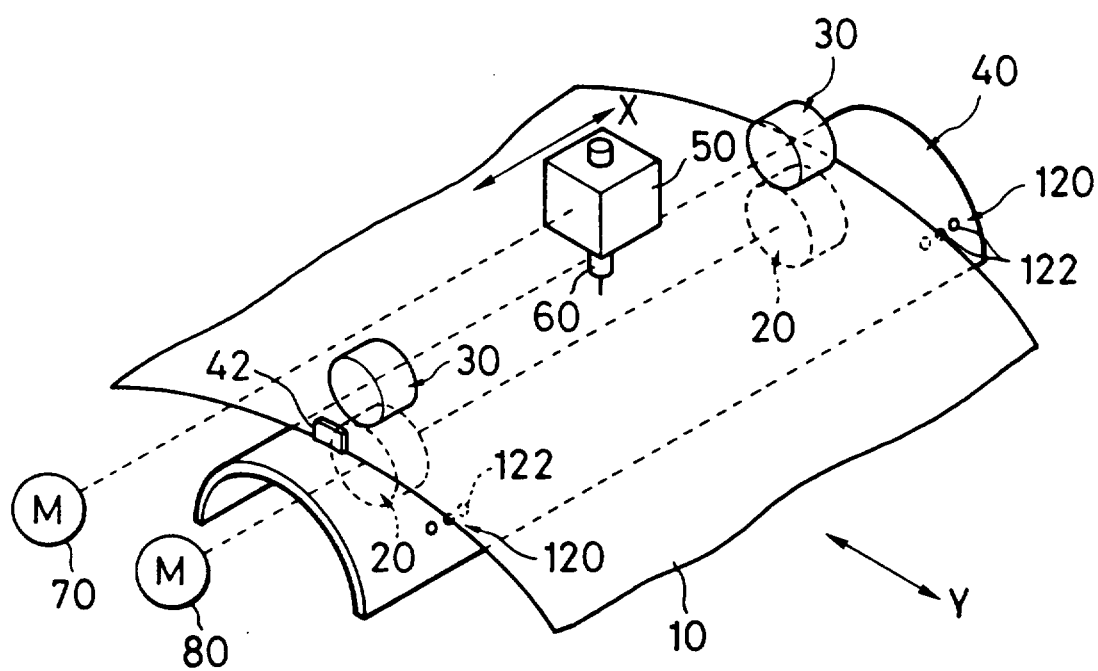
FIG. 1 is a partial perspective view showing the schematic structure of an embodiment of a plotter according to the present invention.

In this way, the feed speed of one side edge of the sheet 10 and that of the other side edge of this sheet 10 based on the turning forces, which are respectively transmitted to both the side edges of the sheet 10 from the peripheral surfaces of the drive rollers 20 mounted at both the sideward parts of a recording surface so as to be synchronously rotated, are increased or lowered relative to each other, whereby the sheet 10 wobbling either rightwards or leftwards has its orbit corrected in a Y direction (as indicated in FIG. 1). Concretely, in a case where the sheet feed speed based on the turning force transmitted from the peripheral surface of the right drive roller 20 to the right side edge of the sheet 10 is made higher than the sheet feed speed based on the turning force transmitted from the peripheral surface of the left drive roller 20 to the left side edge of the sheet 10, in the above way, the orbit of the sheet 10 is corrected leftwards. Conversely, in a case where the sheet feed speed based on the turning force transmitted from the peripheral surface of the left drive roller 20 to the left side edge of the sheet 10 is made higher than the sheet feed speed based on the turning force transmitted from the peripheral surface of the right drive roller 20 to the right side edge of the sheet 10, the orbit of the sheet 10 is corrected rightwards.

Next, an embodiment of the plotter according to the present invention will be described with reference to FIGS. 1 thru 3.

In the drawings, numeral 40 designates the recording surface of the plotter called the "paper moving type", on which a sheet 10 is placed, which has a vertical section substantially in the shape of a circular arc and which is laterally long.

A pen carriage 50, which grasps a writing utensil such as pen 60 or which grasps a cutter in a rotatable manner (in FIG. 1, the writing utensil 60 is grasped), is supported over the recording surface 40 through support means (not shown) so as to be movable in the lengthwise direction, namely, X direction of the recording surface 40.

A driving motor, such as servomotor or stepping motor, 70 is coupled to the pen carriage 50 through transmission means (not shown) for transmitting the turning force of this motor.

Drive rollers 20 are respectively mounted at both the sideward parts of the recording surface 40 so as to be rotatable in the Y direction of this recording surface, in the state in which the partial peripheral surfaces of the drive rollers 20 are exposed over the recording surface 40.

A driving motor, such as servomotor or stepping motor, 80 for synchronously rotating the drive rollers 20 at both the sideward parts of the recording surface 40 in the widthwise direction, namely, Y direction of the recording surface 40 is coupled to these drive rollers 20 through transmission means (not shown) for transmitting the turning force of the motor 80.

The peripheral surface of each of the drive rollers 20 is formed with milling or ruggedness to its surface 22 for preventing the slip of the sheet 10, for example, knurling in the shape of parallel teeth or twill teeth, or granular teeth (in the illustration, the milling in the shape of the parallel teeth is formed).

Pinch rollers 30 are respectively mounted over and opposite the drive rollers 20 at both the sideward parts of the recording surface 40 so as to be rotatable in the Y direction of this recording surface, in the state in which the partial peripheral surfaces of the pinch rollers 30 are held in contact with those of the drive rollers 20 exposed over the recording surface 40. The pinch rollers 30 are formed of an elastic material, for example, rubber.

With the above construction, as illustrated in FIG. 1, in the state in which the sheet 10 is placed on the recording surface 40 and has both its side edges held between the drive rollers 20 and the corresponding pinch rollers 30 mounted at both the sideward parts of the recording surface 40 in opposition to each other, the driving motor 80 is rotated to synchronously rotate the drive rollers 20 at both the sideward parts of the recording surface 40 and to move the sheet 10 in the Y direction on the recording surface 40. Simultaneously, in the state in which the writing utensil 60 or the cutter grasped by the pen carriage 50 is touched down to the front surface of the sheet 10 put on the recording surface 40, the driving motor 70 is rotated to move the pen carriage 50 in the X direction on the sheet 10. Thus, a figure, a character or the like can be automatically depicted on the surface of the sheet 10, or the contours of a figure, a character or the like can be automatically cut in the surface of the sheet 10.

The construction described above is similar to the construction of the prior-art plotter. In addition to the foregoing construction, the plotter which is the preferred embodiment of the present invention comprises pressure regulation means 100 for regulating in, for example, three stages of intensities the pressure which acts to press the peripheral surface of the pinch roller 30 at the corresponding one of both the sideward parts of the recording surface 40 against the front surface of the sheet 10 sandwiched between this pinch roller 30 and the drive roller 20 associated therewith.

Figure 2:
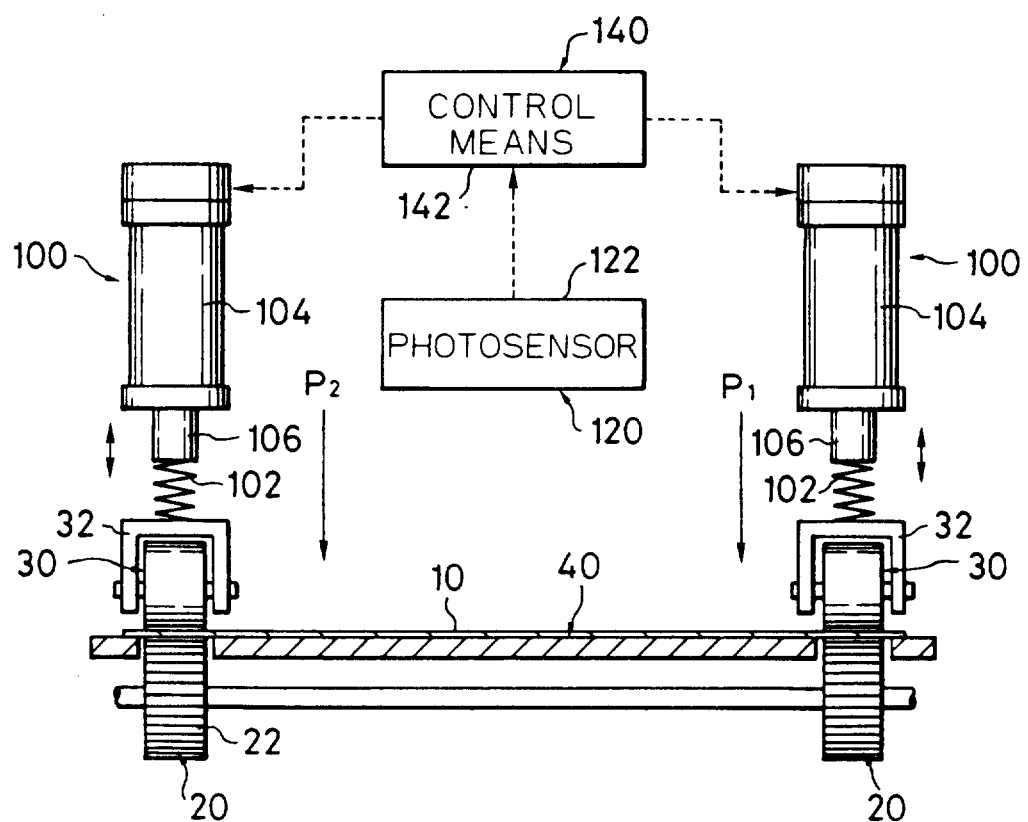
FIG. 2 is a front view for explaining the schematic structure of a sheet feed mechanism in the embodiment of the plotter according to the present invention.

Concretely, as shown in FIG. 2 by way of example, a bearing 32 by which the corresponding pinch roller 30 is rotatably supported is fixed to a plotter casing (not shown) through a coiled compression spring 102 as well as an electrically-driven cylinder 104. Herein, the length of a piston rod 106 to project out of the electrically-driven cylinder 104 is adjusted. Then, the coiled compression spring 102 fixed to the fore end of the piston rod 106 is protracted or retracted so as to adjust the length thereof in, for example, three stages of dimensions. Thus, the pressure, under which the peripheral surface of the pinch roller 30 rotatably supported by the fore end of the coiled compression spring 102 through the bearing 32 is pressed against the surface of the sheet 10, can be regulated in the three stages of intensities by way of example.

Besides, the plotter comprises sensing means 120 for sensing the wobbling direction and wobbling degree of the sheet, such as a roll of paper, 10 moving in the Y direction on the recording surface 40.

Concretely, as shown in FIG. 1 by way of example, a sheet guide 42 is mounted on a part of the recording surface 40, and a plurality of (in the illustration, three) photosensors 122 are arrayed in the X direction on each side of the recording surface 40 in order to sense the wobbling direction and wobbling degree of the sheet 10 when this sheet has begun to wobble or meander either rightwards or leftwards. Herein, whether or not any of the plurality of photosensors 122 disposed on each side of the recording surface 40 is covered with the sheet 10 moving on the recording surface 40 is sensed by these photosensors. Thus, it is possible to discriminate whether or not the sheet 10 moving on the recording surface 40 is wobbling, and the right or left side and the degree to which the sheet 10 is wobbling.

Further, the plotter comprises control means 140 for controlling the pressure regulation means 100 in accordance with the wobbling direction and wobbling degree of the sheet 10 sensed by the sensing means 120, thereby to regulate in, for example, the three stages of intensities the pressures which act to press the peripheral surfaces of the pinch rollers 30 at both the sideward parts of the recording surface 40 against the surface of the sheet 10 sandwiched between these pinch rollers 30 and the drive rollers 20 associated therewith.

Concretely, the control means 140 includes electronic control means 142. The arrays of photosensors 122 disposed on the recording surface 40 sense the positions of the end edges of the sheet 10 moving on the recording surface 40. In this way, they sense the wobbling direction and wobbling degree of the sheet 10 in the case of the wobble. On the basis of the wobbling direction and wobbling degree of the sheet 10 thus sensed, the electronic control means 142 actuates at least either of the electrically-driven cylinders 104 at both the sideward parts of the recording surface 40, whereby the projection length of at least either of the piston rods 106 to project out of the corresponding cylinder 104 is adjusted in three stages of dimensions by way of example.

Figure 3:
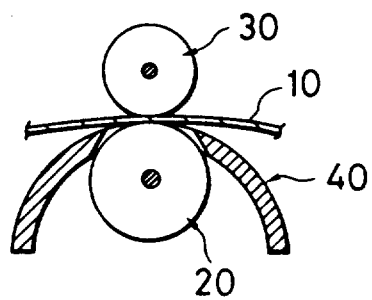
FIG. 3 is a side sectional view of a portion of FIG. 2, showing a recording surface and its surroundings.

The plotter illustrated in FIGS. 1 thru 3 is constructed as described above. According to this plotter, in the state in which both the side edges of the sheet 10 are respectively held between the drive rollers 20 and the corresponding pinch rollers 30 mounted at both the sideward parts of the recording surface 40 in opposition to each other, the drive rollers 20 at both the sideward parts of the recording surface 40 are synchronously rotated in the Y direction by rotating the driving motor 80, so as to move the sheet 10 in the Y direction on the recording surface 40. Herein, when the sheet 10 has begun to wobble either rightwards or leftwards, the photosensors 122 sense the wobbling direction and wobbling degree of the sheet 10. Subsequently, in accordance with the wobbling direction and wobbling degree of the sheet 10 sensed by the photosensors 122, the control means 142 adjusts the projection lengths of the piston rods 106 projecting out of the electrically-driven cylinders 104 at both the sideward parts of the recording surface 40, in the three stages of dimensions by way of example. Thus, the pressure P1 or P2 pressing either of the pinch rollers 30 at both the sideward parts of the recording surface 40 against the surface of the sheet 10 is weakened, while the pressure P2 or P1 pressing the other pinch roller 30 against the surface of the sheet 10 is intensified, relative to the pressure P1 or P2. In consequence, the moving orbit of the sheet 10 having begun to wobble either rightwards or leftwards is corrected in the Y direction.

As described above, according to the plotter of the present invention, a sheet such as a roll of paper can be exactly moved in a sheet feed direction on a recording surface at all times without wobbling on the recording surface.

Accordingly, exact distortionless figures, characters etc. can be depicted on the surface of the sheet moving on the recording surface, and the exact distortionless contours of figures, characters etc. can be cut in the sheet surface.

The preferred embodiments described in this specification and illustrated in the drawings are exemplary and are not restrictive, and various other modifications are, of course, possible. The scope of the invention is defined by the appended claims, and all modifications falling within the significances of those claims shall be covered within the present invention.

What is claimed is:

1. In a plotter having a recording surface, and a drive roller and a pinch roller set held in opposition to each other and respectively disposed in pairs on each sideward part of the recording surface, the improvement comprising:

an outer peripheral surface of each of the drive rollers formed for preventing slip of a sheet, and wherein both side edges of the sheet are respectively held between the drive rollers and the corresponding pinch rollers, the drive rollers on both sides of said recording surface are synchronously rotated, thereby to move the sheet in a rotating direction of the drive rollers on the recording surface;

pressure regulation means for regulating respective pressures created by pressing said pinch rollers on both sides of said recording surface against a surface of the sheet;

sensing means for sensing a direction and a degree of wobbling of the sheet moving in the rotating direction of said drive rollers on said recording surface, and control means for controlling said pressure regulation means in accordance with the direction and degree of the wobbling of the sheet sensed by said sensing means, thereby to regulate the respective pressures pressing said pinch rollers at both the sideward parts of said recording surface against the sheet surface to compensate for the wobbling.

2. A plotter as defined in claim 1, wherein said pressure regulation means includes a spring which urges the corresponding pinch roller against the sheet surface, and a piston-cylinder assembly which protracts or retracts said spring to adjust a length thereof.

3. A plotter as defined in claim 2, wherein said piston-cylinder assembly is electrically-driven and is actuated by said control means.

4. A plotter as defined in claim 1, wherein said sensing means includes sets of photosensors which are respectively arrayed in a lateral direction orthogonal to the rotating direction of said drive rollers on both of the sides of said recording surface.

5. A plotter as defined in claim 1, wherein said control means can decrease the pressure of said pressure regulation means located on the side of said recording surface toward which the sheet wobbles or increases the pressure of said pressure regulation means located on the side of said recording surface which is opposite to the side of said recording surface toward which the sheet wobbles, thereby to correct a moving orbit of the sheet.

6. A plotter as defined in claim 2, wherein said pressure regulation means changes the pressure in separate stages of pressure levels.

7. A plotter as defined in claim 1, wherein said pinch rollers are formed of an elastic material.

8. A plotter as defined in claim 1, wherein said control means can relatively vary the pressure on the respective pressure regulation means to compensate for any misalignment of the sheet.

9. In a plotter having a recording surface, a pen carriage which grasps a writing utensil or a cutter and which moves in a lateral direction of the recording surface on a sheet placed on this recording surface, and drive rollers, each of which has its outer peripheral surface formed for preventing slip of the sheet, as well as pinch rollers which are made of an elastic material and which are rotatably supported by bearings, respectively, the drive rollers and the pinch rollers forming sets in each set of which the drive roller and the corresponding pinch roller are held in opposition to each other and are respectively disposed at both sideward parts of the recording surface, wherein in a state in which both side edges of the sheet are respectively held between the drive rollers and the corresponding pinch rollers, the drive rollers on both sides of said recording surface are synchronously rotated by a driving motor, thereby to move the sheet in a rotating direction of the drive rollers on the recording surface, the improvement comprising:

pressure regulation means for regulating respective pressures pressing said pinch rollers on both sides of said recording surface against a surface of the sheet, the peripheral surfaces of the drive rollers being of a noncircular configuration;

sensing means for sensing a direction and a degree of wobbling of the sheet as the sheet moves in the rotating direction of said drive rollers on said recording surface, and control means for controlling said pressure regulation means in accordance with the direction and degree of the wobbling of the sheet sensed by said sensing means, thereby to regulate the respective pressures pressing said pinch rollers at both of the sideward parts of said recording surface against the sheet surface.

10. A plotter as defined in claim 9, wherein said pressure regulation means includes a piston-cylinder assembly fixed to a plotter casing, and a compression spring retained between a piston rod of said piston-cylinder assembly and said bearing, and the piston rod protracts or retracts said spring to adjust a length thereof.

11. A plotter as defined in claim 10, wherein said sensing means includes sets of photosensors which are respectively arrayed in the lateral direction on both of the sides of said recording surface, and said piston-cylinder assembly is electrically-driven and is actuated by said control means.

12. A plotter as defined in claim 10, wherein said control means protracts said spring of said pressure regulation means located on the side of said recording surface toward which the sheet wobbles, so as to decrease the corresponding pressure, or retracts said spring of said pressure regulation means located on the side which is opposite to the side of said recording surface toward which the sheet wobbles, so as to increase the corresponding pressure, thereby to correct a moving orbit of the sheet.

13. A plotter as defined in claim 12, wherein said pressure regulation means changes the pressure in separate stages of pressure levels.

14. A plotter as defined in claim 9, wherein said control means can respectively vary the pressure on the respective pressure regulation means to compensate for any misalignment of the sheet.

15. An improved sheet moving mechanism for contacting a moving sheet of material to place indicia on the surface or for cutting the sheet into patterns, comprising:

means for moving the sheet material including at least one set of rollers having a drive roller;

means for varying the relative position of the material along a radial distance from a center of rotation of the drive roller to vary a tangential speed of the material relative to the center of rotation of the drive roller while maintaining a driving contact with the drive roller;

means for monitoring the position of the sheet material, and means for controlling the relative position of the material to the radial distance of the drive roller by operating the means for varying in response to the monitoring means to maintain a desired movement of the sheet material.

16. The invention of claim 15 wherein the means for monitoring includes a photosensitive monitor position adjacent an edge of the sheet material.

17. The invention of claim 15 wherein the drive roller has an irregular surface about its peripheral surface.

18. The invention of claim 15 wherein a second set of rollers are in contact with the sheet material and at least one roller surface in each set of rollers has a noncircular peripheral surface.

19. The invention of claim 17 wherein the irregular surface has a sawtooth configuration.

* * * * *